United States Patent
Daftardar et al.

(10) Patent No.: US 8,032,665 B2
(45) Date of Patent: Oct. 4, 2011

(54) CONTROLLER, PROGRAM AND METHODS FOR COMMUNICATING WITH DEVICES COUPLED TO THE CONTROLLER

(75) Inventors: Jayant Mohan Daftardar, Lawrenceville, GA (US); Justin R. McCollum, Lawrenceville, GA (US)

(73) Assignee: LSI Corporation, Milpitas, CA (US)

( * ) Notice: Subject to any disclaimer, the term of this patent is extended or adjusted under 35 U.S.C. 154(b) by 431 days.

(21) Appl. No.: 12/360,529

(22) Filed: Jan. 27, 2009

(65) Prior Publication Data
US 2010/0191871 A1    Jul. 29, 2010

(51) Int. Cl.
*G06F 3/00* (2006.01)
*G06F 13/12* (2006.01)
*G06F 13/38* (2006.01)
(52) U.S. Cl. ............. 710/12; 710/14; 710/62; 710/72
(58) Field of Classification Search .............. None
See application file for complete search history.

(56) References Cited

U.S. PATENT DOCUMENTS

| | | | |
|---|---|---|---|
| 5,239,627 A * | 8/1993 | Beck et al. ............. | 710/72 |
| 6,480,924 B1 * | 11/2002 | Bengtsson et al. ........ | 710/306 |
| 7,248,597 B2 * | 7/2007 | Kim .................. | 370/419 |
| 2005/0046457 A1 * | 3/2005 | Pierce ................ | 327/175 |

* cited by examiner

*Primary Examiner* — Henry Tsai
*Assistant Examiner* — Kris Rhu

(57) ABSTRACT

A controller coupled to a redundant array of inexpensive disks (RAID) includes a processor and a non-volatile memory element. The processor has an input/output port that is configurable in one of an open-drain driver configuration, a high-impedance driver configuration and a totem-pole driver configuration. The totem-pole driver configuration is capable of supplying sufficient current to operate a slave device coupled to the input/output port. Firmware stored in the non-volatile memory device dynamically adjusts the driver configuration to prevent negative voltage swings in a signal communicated via the input/output port.

18 Claims, 7 Drawing Sheets

WRITE-1 TIME SLOT

WRITE-0 TIME SLOT

READ TIME SLOT $60\ \mu S \le t_{SLOT} < 120\ \mu S$
$1\ \mu S \le t_{LOWR} < 15\ \mu S$
$0 \le t_{RELEASE} < 45\ \mu S$
$1\ \mu S \le t_{REC} < \infty$
$t_{RDV} = 15\ \mu S$

RESET & PRESENCE PULSE $480\ \mu S \le t_{RSTL} < \infty$
$480\ \mu S \le t_{RSTH} < \infty$
$15\ \mu S \le t_{PDH} < 60\ \mu S$
$60\ \mu S \le t_{PDL} < 240\ \mu S$

CONTROLLER, PROGRAM AND METHODS FOR COMMUNICATING WITH DEVICES COUPLED TO THE CONTROLLER

TECHNICAL FIELD

The present application relates generally to data-storage systems and, more particularly, to a controller for a redundant array of inexpensive disks (RAID), a program and methods for communicating with devices coupled to the RAID controller.

BACKGROUND

The acronym "RAID" is an umbrella term for computer data-storage schemes that can divide and replicate data among multiple hard-disk drives. Various RAID designs involve two key design goals: increased data reliability and increased input/output performance. When several physical hard-disk drives are set up to use RAID technology, the hard-disk drives are said to be in a RAID array. The RAID array distributes data across several hard-disk drives, but the array is exposed to the operating system as a single logical disk drive.

The MegaRAID® family of RAID controllers are deployed in a wide variety of RAID storage solutions. Mega-RAID® is the registered trademark of LSI Corporation, a Delaware corporation having a place of business at 1110 American Parkway NE, Allentown, Pa., U.S.A. 18109-9138. These RAID controllers are configured with a bi-directional input/output (IO) port that is often coupled to 1-Wire® devices called an iButton® to selectively enable or disable various features provided on the controllers. 1-Wire® and iButton® are registered trademarks of Maxim Integrated Products, Inc., a Delaware corporation having a place of business at 120 Sand Gabriel Dr., Sunnyvale, Calif., U.S.A. 94086. The bi-directional IO port can be arranged to operate in one of three driver configurations, open-drain, totem-pole and high-impedance.

The 1-Wire® bus architecture supports multiple devices that share a single (one wire) data bus and a common electrical ground. The multiple devices are connected in an open-drain driver arrangement and are designed to operate at transistor-transistor logic (TTL) levels. Standard TTL circuits use a 5-volt power supply. A TTL input signal is defined as "low" when the signal voltage is between 0 V and 0.8 V with respect to the ground terminal, and "high" when the signal voltage is between 2.2 V and 5 V. When MegaRAID® controllers are operated with 3.3-volt power supplies, circuit elements forming the bi-directional IO port cannot supply the required current when the IO port is configured to operate in the open-drain driver configuration. The inability of the controller to supply the required current becomes particularly problematic for devices in certain functional modes. Accordingly, deployed MegaRAID® controllers cannot be reliably re-programmed.

The following analysis highlights the problem. In many programming modes, the minimum high-input voltage defined for 1-wire devices ($VH_{min}$) is 2.8V. The maximum current the controller can consume when the IO port is arranged in the open-drain driver configuration is 800 μA to 1000 μA. At 3.3 V with 10% regulation, a calculated value of the resistance of a pull-up resistor $R_{pup}$ is:

$$[(3.3*0.9)-2.8]V/1000 uA=170 ohms.$$

During a nominal data transfer operation (i.e., a read/write operation), a maximum low-input voltage ($VL_{max}$) is 0.8V. At 3.3V with 10% regulation, a load current $I_{load}$ can be calculated as:

$$[(3.3*1.1)-0.8]V/170 ohm=16.6 mA.$$

However, 1-Wire® devices can sink a maximum current of 4 mA, while maintaining a logical low voltage level (at 0.4V). Consequently, a minimum value for the resistance of a pull-up resistor $R_{pup}$ is:

$$[(3.3*1.1)-0.8]V/4 mA=700 ohm.$$

Accordingly, for values of $R_{pup}$ lower than 770 Ohms (assuming 10% tolerance), normal read operations cannot be guaranteed as the controller will be unable to supply the current required to maintain the signal voltage.

One well-known solution to the above described problem (not illustrated) is to add a pull-up bypass circuit that is enabled by another IO port of the controller during those times when the controller needs to supply a high current load. This well-known solution requires an additional IO port coupled to a switch (e.g., a transistor) to control a bypass resistor coupled between a power supply and $R_{pup}$.

However, many MegaRAID® controllers are presently deployed in the circuit arrangement illustrated in FIG. 1. That is, a single general-purpose IO port (GPIO) is used to communicate with an iButton® device. The conventional circuit 10 includes a power supply 15, a controller 20, a resistor network 30, and an iButton® device 40. The power supply 15 provides a voltage VDD via connection 17 to the controller 20 and a voltage Vpup via connection 19 to the resistor network 30. The power supply 15 is coupled to electrical ground by connection 13. The controller 20 is coupled to electrical ground by connection 21. The controller 20 includes a GPIO port 25, which is coupled to the resistor network 30. The resistor network 30 is coupled to the power supply via a first port 32. The resistor network 30 is further coupled to the iButton® device 40 via a second port 34 and the GPIO port 25 via a third port 36. The resistor network 30 includes a first resistor R1, having a first resistance, coupled between the first port 32 and the second port 34. The resistor network also includes a second resistor R2, having a second resistance, coupled in series with the first resistor between the first port 32 and the third port 36. As further illustrated, the iButton® device 40 is coupled between the second port 34 and electrical ground with the second port 34 coupled between the first and second resistors. In an embodiment, the resistance of R1 is approximately 750 Ohms and the resistance of R2 is approximately 100 Ohms. As is known, additional external devices can be coupled to the controller 20 via the resistor network 30 by coupling each additional device in series via the second port 34.

The iButton® device 40 is a semiconductor circuit or circuits housed in a metal enclosure. The electrical interface, as illustrated in FIG. 1, is a single, serial data line and a ground reference. Energy for operating the iButton® device 40 is taken from the serial data line (i.e., the conductor coupled to the second port 34) or from an internal battery (e.g., a lithium cell). Logical functions enabled by the semiconductor circuit (s) include but are not limited to a serial number stored in memory, password protected memory, non-volatile random access memory (RAM) or erasable programmable read only memory (EPROM), a temperature sensor, and a real time clock in combination with RAM. The iButton® device 40 communicates with a master device (e.g., the controller 20) via the serial 1-Wire® protocol, which transfers data using discrete time slots.

SUMMARY

An embodiment of a controller configured to operate a redundant array of inexpensive disks (RAID) includes a processor and a non-volatile memory element. The processor has an input/output port configurable in one of an open-drain driver configuration, a high-impedance driver configuration and a totem-pole configuration. The non-volatile memory element stores a set of executable instructions (i.e., a program) that when executed by the processor dynamically adjust the driver configuration to prevent a negative voltage swing of a signal communicated via the input/output port.

An embodiment of a program suitable for dynamically controlling an IO port of a RAID controller includes logic configured to determine when a next operation to be performed by the controller will require a current level that exceeds the maximum that can be supplied by the controller in an open-drain or tri-state driver configuration and logic configured to determine the nature of a present data operation on the IO port. The program further includes modified read logic and modified write logic. The modified read logic directs the controller to process N-1 bits of an N-bit word in an open-drain configuration, process the $N^{th}$ bit and determine when the voltage on the IO port enters a first logic range. Once the voltage on the IO port enters the first logic range, the modified read logic sets the IO port to operate in a totem-pole configuration until the high-current mode operation is complete. Thereafter, the IO port is returned to the open-drain driver configuration. The modified write logic processes N-1 bits of an N-bit word in an open-drain driver configuration. Thereafter, the modified write logic is configured to set the IO port to the totem-pole driver configuration and process the $N^{th}$ bit. The modified write logic waits until the high-current operation is complete before setting the IO port of the controller to the open-drain driver configuration.

An embodiment of a method for dynamically configuring a controller for a redundant array of inexpensive disks (RAID) to communicate with an external device includes the steps of determining when an operation preceding a high-current load operation on an input/output port of the controller is a first data operation, if so, configuring the input/output port to a totem-pole driver configuration 1-bit transaction earlier. Otherwise, when the operation preceding a high-current load operation on the input/output port of the controller is a second data operation, adaptively scanning the input/output port during a last bit transaction to detect when the input/output port is in a logic high range, if so, configuring the input/output port to the totem-pole driver configuration. Otherwise, maintaining a present driver configuration.

An embodiment of a method for dynamically configuring a controller for a redundant array of inexpensive disks (RAID) to communicate with an external device includes the steps of configuring the input/output port of the controller to operate in an open-drain configuration, using firmware to determine when the next operation requires a high-current load, if so, determining when the present operation is a read operation, when the present operation is a read operation, using the input/output port to process N-1 bits of a N-bit word in an open-drain configuration, processing an $N^{th}$ bit of the N-bit word and adaptively scanning the input/output port to determine when the input/put port enters a first logic range, when the input/output port enters the first logic range, configuring the input/output port to operate in a totem-pole configuration, maintaining the totem-pole configuration until the next operation is complete and configuring the input/output port to operate in the open-drain configuration. Otherwise, when the present operation is a write operation, using the input/output port to process N-1 bits of the N-bit word in the open-drain configuration, configuring the input/output port to operate in the totem-pole configuration, processing the Nth bit of the N-bit word and configuring the input/output port to operate in the open-drain configuration.

The figures and detailed description that follow are not exhaustive. The disclosed embodiments are illustrated and described to enable one of ordinary skill to make and use the improved RAID controller, program and methods for communicating with devices coupled to the RAID controller. Other embodiments, features and advantages of the controller, program and methods will be or will become apparent to those skilled in the art upon examination of the following figures and detailed description. All such additional embodiments, features and advantages are within the scope of the controller, program and methods as defined in the accompanying claims.

BRIEF DESCRIPTION OF THE FIGURES

The controller, program and methods for dynamically configuring a RAID controller can be better understood with reference to the following figures. The elements and features within the figures are not necessarily to scale, emphasis instead being placed upon clearly illustrating the principles for dynamically programming a RAID controller to communicate with an external device. Moreover, in the figures, like reference numerals designate corresponding parts throughout the different views.

DETAILED DESCRIPTION

A controller coupled to an external or slave device (e.g., an iButton® device) includes a processor and a non-volatile memory element. The processor has an input/output port that is configurable in one of an open-drain driver configuration, a high-impedance driver configuration and a totem-pole driver configuration. The totem-pole driver configuration is capable of supplying sufficient current to operate a slave device coupled to the bi-directional IO port in certain functional modes where the slave device consumes current in excess of the current that can be provided by a pull-up resistor network. Example operations demanding a high current load are programming an iButton® device (800 μA) or performing a secure hash algorithm 1 authentication or update (1000 μA) on an iButton® device. A typical input load current on an iButton® device is approximately 10 μA. Consequently, for these high-current load operations, the current requirements are about 80 to 100 times higher than the typical current load. Firmware stored in the non-volatile memory device dynamically adjusts the driver configuration to prevent negative voltage swings in a digital signal communicated via the bi-directional IO port. The present solution is not limited to iButton® device programming, since it can be applied to any slave device with 1-wire interface that demands a high current load while executing certain functions. This includes iButton® memory authentication which is a read only operation that also demands a high current load. Unlike iButton® device programming, memory authentication is a periodic operation that is executed after every reboot of the controller.

Figure 1:
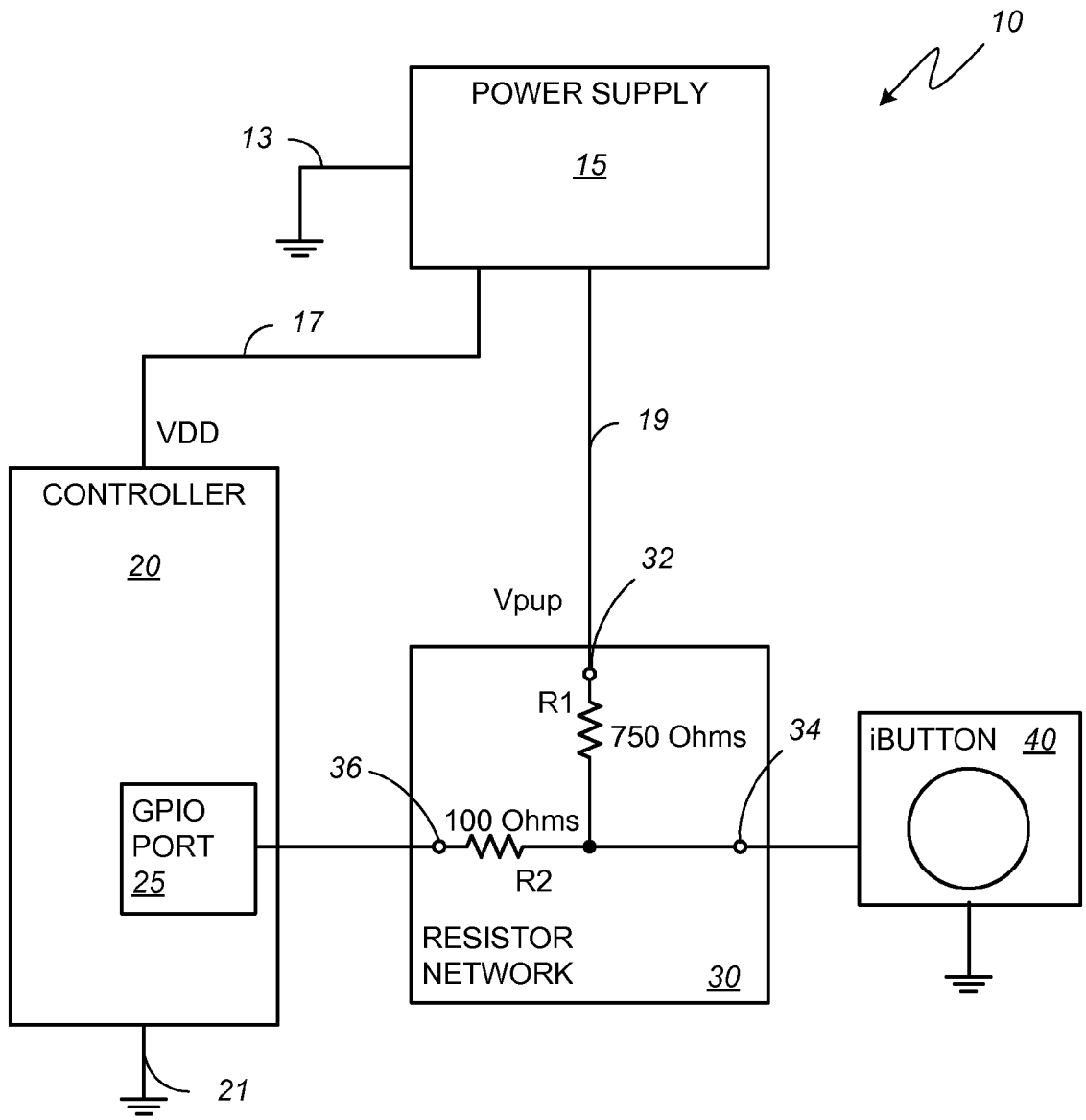
FIG. 1 is a circuit diagram illustrating an 10 circuit coupled to a conventional RAID controller.

A GPIO pin used for communicating with an external device is selectively changed from an open-drain driver configuration to a totem-pole driver configuration during operational modes that require the controller to supply an amount of current in excess of that possible using the conventional circuit of FIG. 1. Each GPIO pin on deployed MegaRAID® controllers (e.g., model number 1078) can be programmed in one of three driver configurations (i.e., open-drain, tri-state or high-impedance and totem-pole). However, programming of the output driver coupled to the GPIO pins was intended to take place during initialization and was not expected to change dynamically during run-time operation of the controller.

During a nominal 1-Wire® data write operation, when a logic 0 is to be written the open-drain driver configuration is used and the GPIO port supplies the necessary current. When a logic 1 is to be written, the tri-state driver configuration is selected and the resistor network and Vpup provide the required current to keep the voltage on the GPIO port from dropping below a logical high minimum voltage level. During a nominal 1-Wire® data read operation, the tri-state driver configuration is selected and the slave device (e.g., an iButton®) drives the data line. During a high-current or programming mode, the GPIO port is configured in the totem-pole driver configuration and the required current is supplied from the GPIO port directly using the series pass 100 Ohm resistor.

Specifically, if the data operation just preceding the high-current mode is a write operation then firmware in the RAID controller enters the high current mode 1 bit-transaction earlier to prevent negative swing on the IO port due to over sinking of current by the iButton® device. If the data operation just preceding the high-current mode is a read operation, then firmware in the RAID controller performs a continuous adaptive scan of the voltage on the IO port during the last bit-transaction to detect if the iButton® device has pulled the voltage on the IO port to a logic 1 or HIGH, upon which the RAID controller configures the IO port to a totem-pole driver configuration to prevent a negative voltage swing on the IO port due to over sinking of current by the iButton® device. Using the above described modifications, the IO port pins on a RAID controller can remain in a one-to-one ratio with each external device, while permitting accurate data transfers even with a power supply voltage lower than the 5.0 V supply voltage designated by the 1-Wire® protocol.

iButton® devices are self-timed semiconductor devices. The timing logic provides a means of measuring and generating digital pulses of various widths. Data transfers are bit-sequential and half-duplex. Data can be interpreted as commands (according to a prearranged format) that are compared to information already stored in the iButton® device to make a decision, or can simply be stored in the iButton® device for later retrieval. iButton® devices are considered slaves, while the host reader/writer (e.g., the controller 20) is considered a master.

iButton® devices operate in an open drain environment on voltage levels ranging from 2.8 V (minimum pullup voltage) to 6 V (maximum pullup voltage). All voltages greater than 2.2 V are interpreted as logic 1 or HIGH, voltages less than 0.8 V are considered as logic 0 or LOW. Voltages greater than 2.2 V and under 6 V define a first logic range. Voltages less than 0.8 V and greater than or equal to 0 V define a second logic range. The pullup voltage must be a minimum of 2.8 V to recharge an internal storage capacitor that is used to supply power during periods when the data line is LOW. The size of this capacitor is about 800 pF. This capacitance is seen for a short time when the iButton® device 40 is contacted by a probe. After the capacitor is charged, only a very small fraction of this capacitance is recognizable, according to the charge required to refill to a full charge state. The total time constant to charge the capacitor is defined by the capacitor itself, the internal resistances of about 1 kOhm, the resistance of the cable and contacts, the cable capacitance, and the resistor pulling up the data line.

Reference is now directed to the timing diagrams illustrated in FIGS. 2A-2D.

Figure 2A:
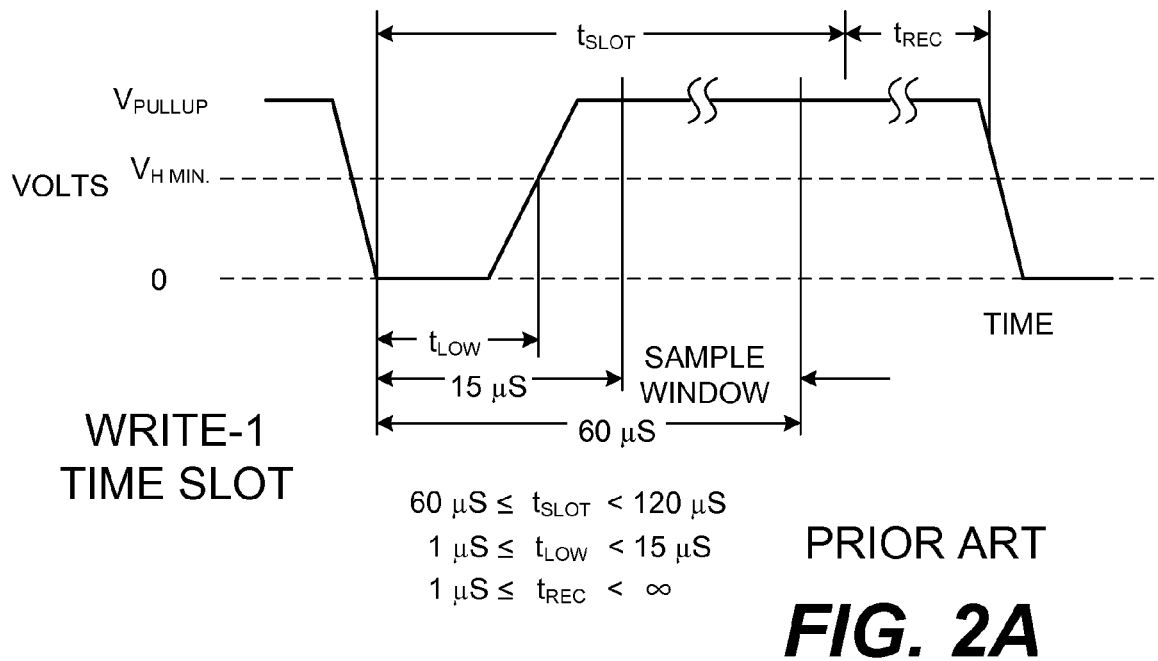
FIGS. 2A-2D are timing diagrams illustrating 1-Wire® waveforms for write, read and reset operations at the general purpose IO port of FIG. 1.
Figure 2B:
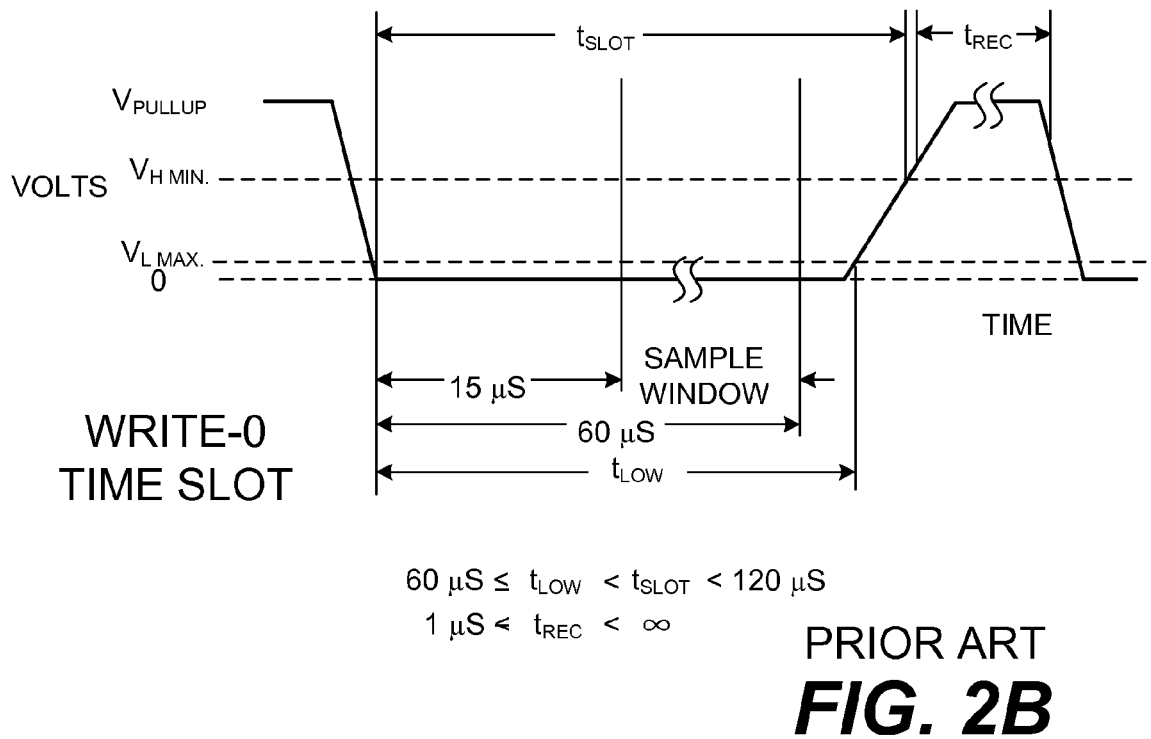

The waveforms to write commands or data to iButton® devices are called write-1 and write-0 time slots. FIG. 2A is a timing diagram illustrating a 1-Wire® waveform for a write-1 time slot. FIG. 2B is a timing diagram illustrating a 1-Wire® waveform for a write-0 time slot. Timing relationships in iButton® devices for data write operations are defined by the respective time slots. Because the falling slope is the least sensitive to capacitive loading in an open-drain environment, iButton® devices use this edge to synchronize their internal timing circuitry. The duration of a low pulse to write a 1 ($t_{LOW}$, FIG. 2A) must be shorter than 15 µs. To write a 0, the duration of the low pulse ($t_{LOW}$, FIG. 2B) must be at least 60 µs to cope with worst-case conditions. By definition, the active part of a 1-Wire time slot ($t_{SLOT}$) is a minimum of 60 µs. After the active part of the time slot, the data line needs to be inactive for a minimum of 1 µs at a voltage of 2.8 V or higher to recharge the internal capacitor. The inactive time is defined by $t_{REC}$ in the timing diagrams of FIGS. 2A and 2B.

Under nominal conditions, an iButton® device will sample the line 30 µs after the falling edge of the start condition. The internal time base of each individual iButton® device may deviate from this nominal sample time. The allowed tolerance band ranges from 15 µs to 60 µs. In other words, sampling in an iButton® device may occur anywhere between 15 µs and 60 µs after the start condition, as illustrated in the write-1 and write 0 time slots of FIG. 2A and FIG. 2B, respectively. During this time frame the voltage on the data line must stay below a maximum voltage that defines the upper limit of the range of a logic 0 or LOW (i.e., 0.8 V) or above a minimum voltage (i.e., 2.8 V) that defines the upper limit of the range of a logic 1 or HIGH.

The duration of the active part of a time slot can be extended beyond 60 µs. The maximum extension is limited by the fact that a low pulse of a duration of at least eight active time slots (480 µs) is defined as a reset pulse. Allowing the same worst-case tolerance ratio, a low pulse of 120 µs might be sufficient for a reset. This limits the extension of the active part of a time slot to a maximum of 120 µs to prevent misinterpretation with a reset.

At the end of the active part of each time slot, each iButton® device needs a recovery time $t_{REC}$ of a minimum of 1 µs to prepare for the next bit. This recovery time is the inactive part of a time slot, since it is added to the duration of the active part to obtain the time it takes to transfer one bit. Commands and data are sent to iButton® devices by combining write-0 and write-1 time slots. The wide tolerance of the time slots and the non-critical recovery time enable even relatively slow microprocessors to meet the timing requirements for 1-Wire® communication.

Figure 2C:
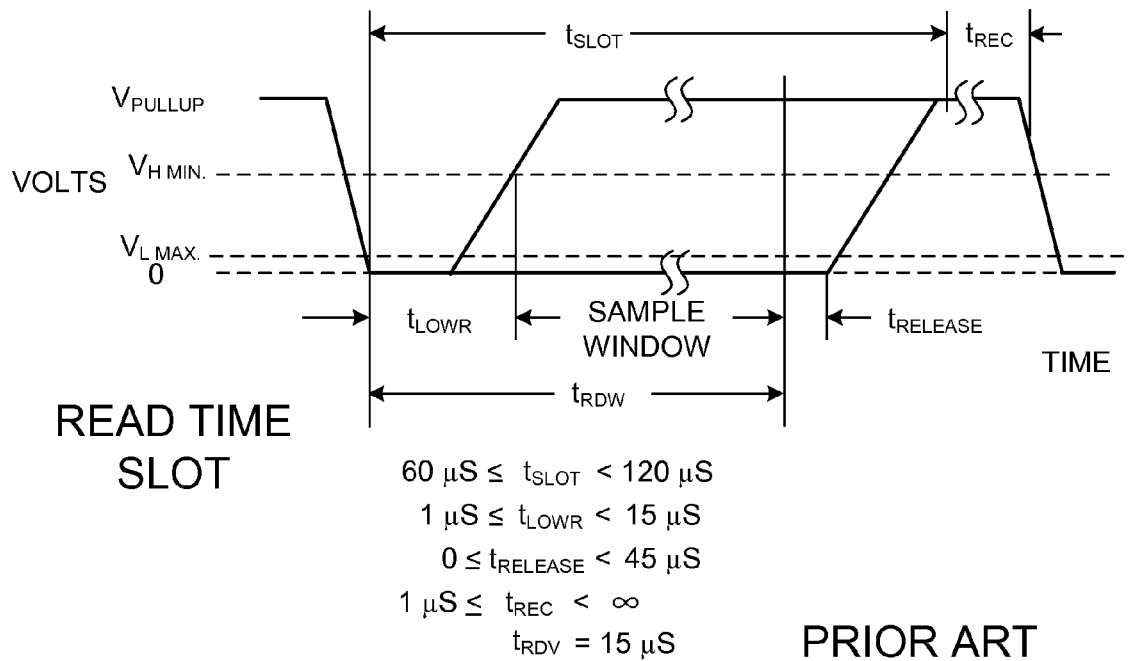

To read data, the RAID controller or master has to generate read-data time slots to define the start condition of each bit. The read-data time slot, as illustrated in FIG. 2C, looks essentially the same as the write-1 time slot from the RAID controller's point of view. Starting at the high-to-low transition, the iButton® device sends 1 bit of its addressed contents. If the data bit is a 1, the iButton® device leaves the pulse unchanged. If the data bit is a 0, the iButton® device will pull the data line low for $t_{RDV}$ or 15 µs. In this time frame data is valid for reading by the RAID controller or master. The duration $t_{LOWR}$ of the low pulse sent by the RAID controller should be a minimum of 1 µs with a maximum value as short as possible to maximize the sampling window. In order to compensate for the cable capacitance of the 1-Wire® line, the RAID controller should sample as close to 15 µs after the synchronization edge as possible. Following $t_{RDV}$ there is an additional time interval, $t_{RELEASE}$, after which the iButton® device releases the 1-Wire® line so that its voltage can return to $V_{PULLUP}$. The duration of $t_{RELEASE}$ may vary from 0 to 45 µs; its nominal value is 15 µs.

Figure 2D:
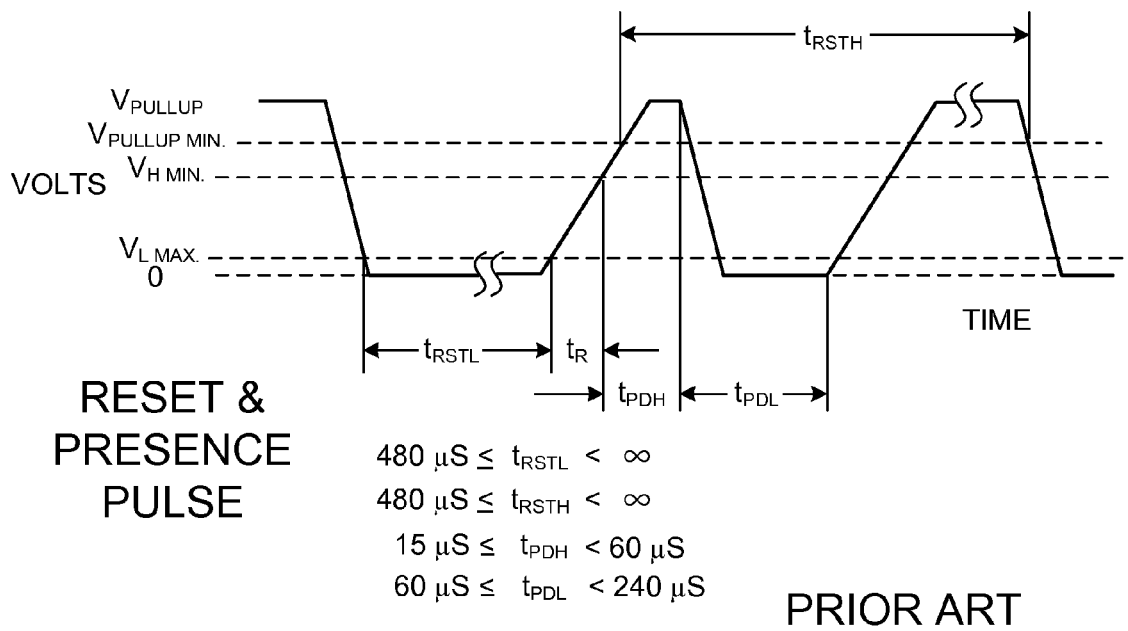

A reset pulse and a presence pulse are illustrated in the timing diagram of FIG. 2D. The reset pulse provides a clear starting condition that supersedes any time slot synchronization. The reset pulse is defined as a single low pulse of a minimum duration of eight time slots or 480 µs followed by a reset-high time $r_{RSTH}$ of another 480 µs. After a reset pulse has been sent, the iButton® device will wait for the time $t_{PDH}$ and then generate a presence pulse of duration $t_{PDL}$. No other communication is allowed during $t_{RSTH}$. The presence pulse can be used to trigger a hardware interrupt or to automatically power up equipment like touch pens. If an iButton® device is disconnected from the probe, it will pull the data line low via an internal current source of 5 µA. This simulates a reset pulse of unlimited duration. As soon as the iButton® device detects a high level on the data line, it will generate a presence pulse.

The nominal values are 30 µs for $t_{PDH}$ and 120 µs for $t_{PDL}$. With the same worst-case tolerance band, the measured $t_{PDH}$ value indicates the internal time base of the fastest device. The sum of the measured $t_{PDH}$ and $t_{PDL}$ values is five times the internal time base of the slowest device. If there is only one device on the line, both values will deviate in the same direction. This correlation can be used to build an adaptive system. Special care must be taken to recalibrate timing after every reset since the individual timing characteristics of the devices vary with temperature and load.

The accuracy of the time measurements required for adaptive timing is limited by the characteristics of the RAID controller's input logic, the time constant of the 1-Wire® line (pullup resistor x cable capacitance) and the applied sampling rate. If the observed rise time or fall time exceeds 1 µs or the highest possible sampling rate is less than 1 MHz, adaptive timing should be avoided.

Figure 3:
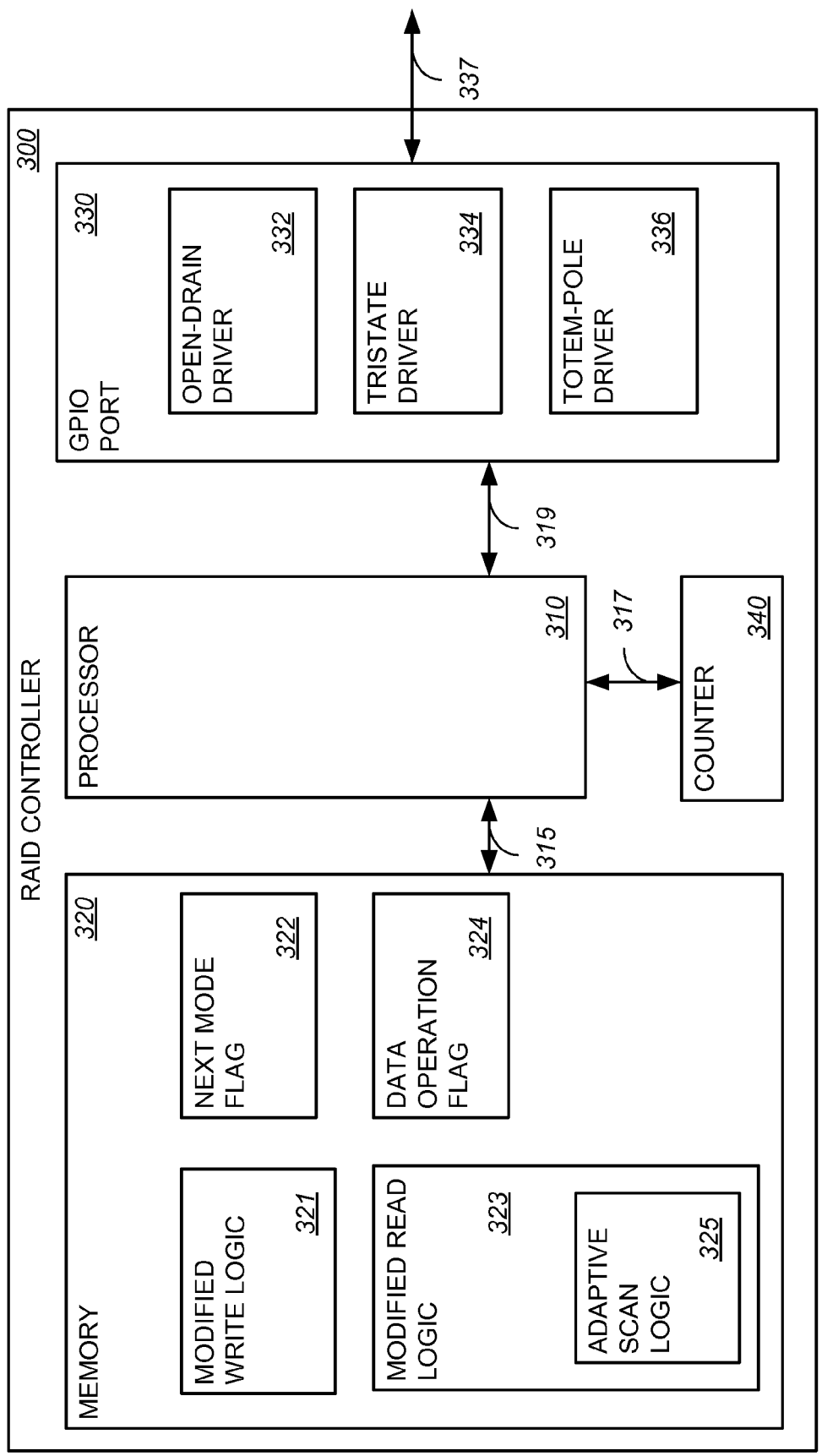
FIG. 3 is a functional block diagram illustrating an embodiment of an improved RAID controller.

FIG. 3 is a functional block diagram illustrating an embodiment of an improved RAID controller 300. The RAID controller 300 includes a processor 310, a memory 320, a GPIO port 330 and a counter 340. In terms of hardware architecture, as shown in FIG. 3, the processor 310 is coupled to the memory 320 via a two-way bus 315. The processor 310 is coupled to the counter 330 via a two-way bus 317 and the GPIO port 330 via a two-way bus 319. The two-way busses 315, 317 and 319 can be, for example but are not limited to, one or more wired or wireless connections, as is known in the art. Each of the two-way busses 315, 317 and 319 may have additional elements, which are omitted for simplicity, such as buffers (caches), drivers, repeaters, and receivers, to enable communications. Further, the two-way busses 315, 317 and 319 may include address, control, and/or data connections to enable appropriate communications among connected components (i.e., the processor 310, the memory 320, the GPIO port 330 and the counter 340.

The processor 310 is a hardware device for executing software, particularly software stored in memory 320. The processor 310 can be any custom made or commercially available processor, a central processing unit (CPU), an auxiliary processor among several processors associated with RAID controller 300, a semiconductor based microprocessor (in the form of a microchip or chip set), or generally any device for executing software instructions.

Memory 320 may include any one or combination of volatile memory elements (e.g., random access memory (RAM, such as DRAM, SRAM, SDRAM, etc.)) and nonvolatile memory elements (e.g., ROM, EPROM, etc.). Moreover, the memory 320 may incorporate electronic, magnetic, optical, and/or other types of storage media. Note that the memory 320 can have a distributed architecture, where various components are situated remote from one another, but can be accessed by the processor 310.

The memory 320 includes a next mode flag 322 and a data operation flag 324.

The next mode flag 322 identifies when the next operation to be performed by the GPIO port 330 of the RAID controller 300 is expected to require an amount of current that exceeds the capability of the GPIO port 330. When the next mode flag 322 is not set, the GPIO port 330 is capable of supplying any current required to maintain desired logic levels on the two-way connection 337. The data operation flag 324 identifies when the present data operation is a write data operation or a read data operation.

The memory 320 may include one or more separate programs or modules, each of which comprises an ordered listing of executable instructions for implementing logical functions. In the example of FIG. 3, the memory 320 includes modified write logic 321 and modified read logic 323. As will be explained in further detail below, the modified read logic 323 further includes adaptive scan logic 325.

The memory 320 may include additional programs or logic including a suitable operating system (not shown) and perhaps other application(s) or programs. The operating system essentially controls the execution of other computer programs and provides scheduling, nominal input-output control, memory management, and related services.

The GPIO port 330 includes an open-drain driver 332, a tri-state driver 334 and a totem-pole driver 336. The GPIO port 330 operates under the direction of the processor 310 to selectively apply one of the open-drain driver 332, the tri-state driver 334 and the totem-pole driver 336 in accordance with expected conditions on two-way connection 337.

The counter 340 identifies a present bit of a N-bit word. The counter 340 increments or decrements a present value each time a new time slot is being processed by the RAID controller 300. The counter 340 can be programmed by the processor 310 to adjust the number of bits in each word.

One or more external or slave devices coupled in series with each other are connected to the RAID controller 300 via two-way connection 337 and the GPIO port 330. Two-way connection 337 is a single data line. External devices communicate with the RAID controller 300 and vice versa by applying the above-described 1-Wire® protocol with modifications on the two-way connection 337. The processor 310, in response to the condition of the next mode flag 322, which indicates when a high-current load operation is the next operation to be performed by the RAID controller 300, and in response to the present data operation being performed by the GPIO port 330, as identified by the data operation flag 324, selectively configures the GPIO port 330 to apply the totem-pole driver. The totem-pole driver 336 is arranged to supply more current than that provided by the open-drain driver 332 of the GPIO port 330.

The modified write logic 321 is configured as follows. If the operation just preceding the high-current mode is a write data operation, the modified write logic 321 directs the GPIO port 330 to select the totem-pole driver 336 before writing the last bit. The modified write logic 321 uses information from the counter 340 to determine when the next to last bit is being processed. Once the last bit has been processed, the modified write logic 321 waits for completion of the high-current mode operation on the GPIO port 330. Thereafter, the modified write logic 321 directs the GPIO port to select the open-drain driver 332.

The modified read logic 323 is configured as follows. If the operation just preceding the high-current mode is a read data operation, the modified read logic 323 directs the GPIO port 330 to receive the first N-1 bits of the N-bit word using the open-drain driver 332. The modified read logic 323 enables the adaptive scan logic 325 to monitor the voltage during the time slot associated with the Nth bit. The adaptive scan logic 325 identifies when a slave device (e.g., an iButton® device 40) coupled to the connection 337 has pulled the voltage to a first logic range (e.g., a logic HIGH). Once the voltage on the connection 337 has been pulled HIGH, the modified read logic 323 directs the GPIO bus 330 to use the totem-pole driver 336 to prevent a negative voltage swing due to sinking of current by the slave device. The modified read logic 325 is further configured to wait for completion of the subsequent high-current mode operation on the GPIO port 330. Thereafter, the modified read logic 323 directs the GPIO port to select the open-drain driver 332.

It should be understood that functional portions of the RAID controller 300 may be enabled by a source program, an executable program (object code), script, or any other entity comprising a set of instructions to be performed. When in the form of a source program, the program needs to be translated via a compiler, assembler, interpreter, or the like, which may or may not be included within the memory 320, so as to operate properly in connection with an operating system (not shown).

Furthermore, portions of a source program may be written in (a) an object oriented programming language, which has classes of data and methods, or (b) a procedure programming language, which has routines, subroutines, and/or functions.

When the logic used by the RAID controller 300 is implemented in software, as is shown in the functional block diagram of FIG. 3, one or more of the modified write logic 321, the modified read logic 323, the adaptive scan logic 325 and/or the counter 340 may be stored on any computer-readable medium for use by or in connection with any computer-related system or method. In the context of this document, a computer-readable medium is an electronic, magnetic, optical, or other physical device or means that can contain or store a computer program and data for use by or in connection with a processor-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where RAID controller 300 is implemented in hardware, it may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
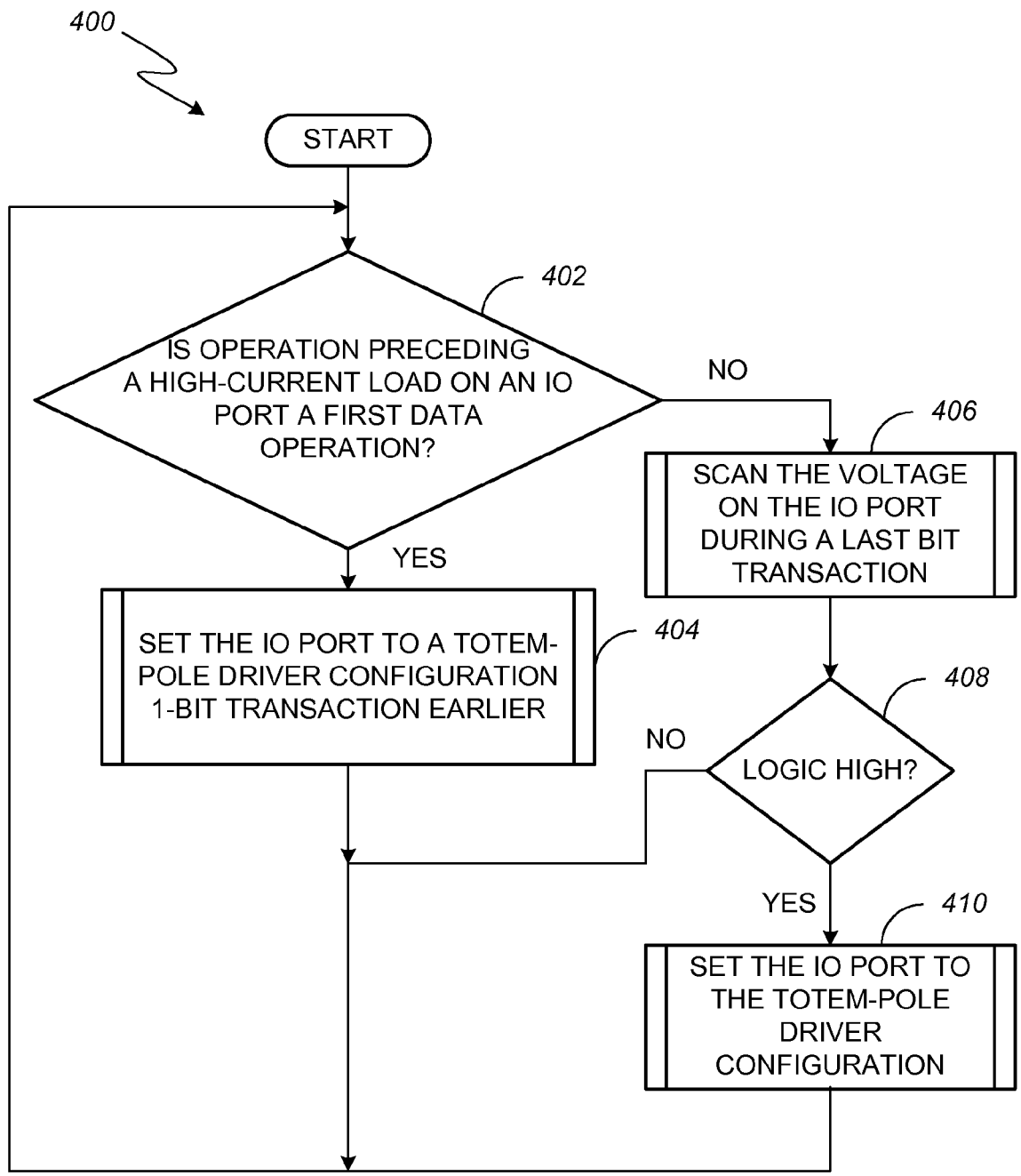
FIG. 4 is a flow diagram illustrating an embodiment of a method for dynamically configuring a controller for a redundant array of inexpensive disks.

FIG. 4 is a flow diagram illustrating an embodiment of a method 400 for dynamically configuring a RAID controller to communicate with an external device. The flow diagram of FIG. 4 shows the architecture, functionality, and operation of a possible implementation via a circuit or circuits, software and or firmware associated with the RAID controller 300. In this regard, each block represents a module, segment, or portion of code, which comprises one or more executable instructions for implementing the specified function(s). When the RAID controller 300 is implemented via hardware, hardware and firmware, or a combination of hardware and software, one or more blocks in the flow diagram may represent an additional circuit or circuits. Alternatively, the described functions can be embodied in source code including human-readable statements written in a programming language or machine code that comprises instructions recognizable by a suitable execution system such as a processor in a computer system. The machine code may be converted from the source code, etc.

Method 400 begins with decision block 402 where a determination is made regarding the nature of a data operation that precedes an operation where a high-current load is expected on an IO port of the RAID controller 300. When the data operation is a first data operation (i.e., a write operation) processing continues with block 404 where the IO port is set to a totem-pole driver configuration 1-bit transaction earlier. The transition to the totem-pole driver configuration prepares the IO port for the successive high-current operation. The totem-pole driver configuration prevents negative swing on the IO port due to over sinking of current by the external (i.e., the slave device). Otherwise, when the data operation is a second data operation (i.e., a read operation), as indicated by the flow control arrow labeled, "NO" exiting decision block 402, processing continues with block 406 where the voltage on the IO port during a last bit transaction is scanned or monitored. Thereafter, in decision block 408, a determination is made whether the voltage on the IO port is within the range of voltages associated with a logic high or "1. " That is, a determination is made whether the slave device has pulled the voltage on the IO port high. When the voltage on the IO port is within the range of voltages associated with a logic high, as indicated by the flow control arrow labeled, "YES," exiting decision block 408, the IO port is set to the totem-pole driver configuration, as shown in block 410. As further indicated by the flow control arrows exiting block 404, block 408 and block 410, processing returns to decision block 402 to prepare the RAID controller 300 for operations preceding an expected high-current load on the IO port.

Exemplary steps for dynamically configuring a RAID controller to communicate with an external device are illustrated in FIG. 4. The particular sequence of the steps or functions in blocks 402 through 410 is presented for illustration. It should be understood that the order of the steps or functions in blocks 402 through 410 can be performed in any other suitable order or modified in a suitable manner to prevent negative swings of the voltage on the IO port.

Figure 5:
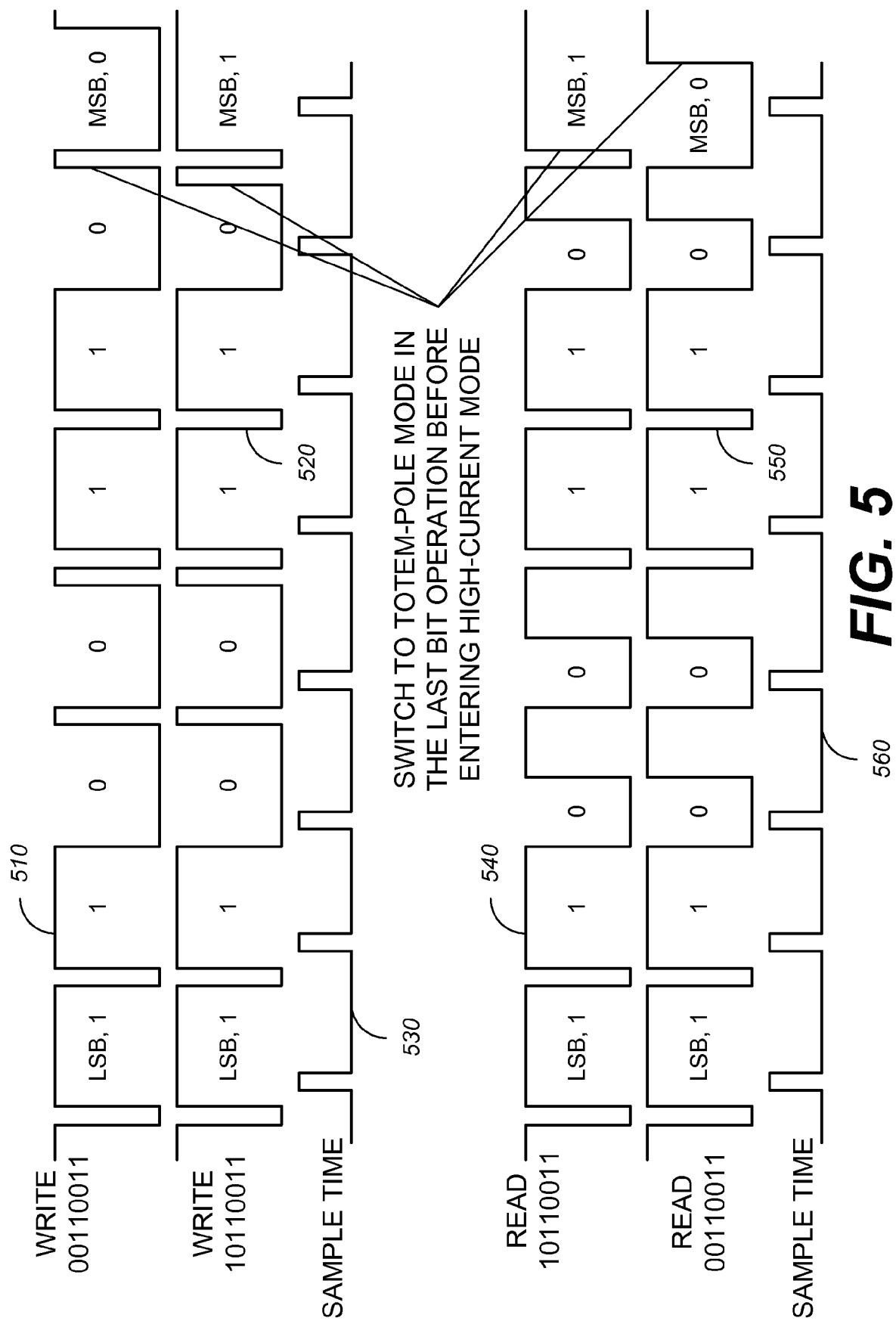
FIG. 5 is a timing diagram illustrating an embodiment of improved read and write operations for processing 1-byte of data.

FIG. 5 is a timing diagram illustrating an embodiment of modified read and write operations for processing 1-byte of data using the RAID controller 300 of FIG. 3. Signal trace 510 illustrates expected voltage levels over time when the RAID controller 300 writes the 8-bit word 00110011. Signal trace 510 is shown with the least significant bit (LSB) at the start or leftmost portion of the trace and the most significant bit (MSB) at the end or rightmost portion of the trace. Signal trace 520 illustrates expected voltage levels over time when the RAID controller 300 writes the 8-bit word 10110011. Signal trace 520 is also shown with the LSB at the start or leftmost portion of the trace and the MSB at the end or rightmost portion of the trace.

In accordance with the modified write logic 321, as described above, the RAID controller 300 switches the GPIO port to totem-pole mode prior to processing the $8^{th}$ bits. Signal trace 530 illustrates when the data bits (i.e., voltages) are being sampled.

Signal trace 540 illustrates expected voltage levels over time when the RAID controller 300 reads the 8-bit word 10110011. Signal trace 550 illustrates expected voltage levels over time when the RAID controller 300 reads the 8-bit word 00110011. Like the signal traces 510 and 520 described above, signal traces 540 and 550 are arranged from the LSB to the MSB from the leftmost portions of the respective signal traces to the rightmost portions of the signal traces. In accordance with the modified read logic 323, as described above, the RAID controller 300 switches the GPIO port to totem-pole mode after processing the $8^{th}$ or final respective bits. Signal trace 560 illustrates when the data bits (i.e., voltages) are being sampled.

Figure 6:
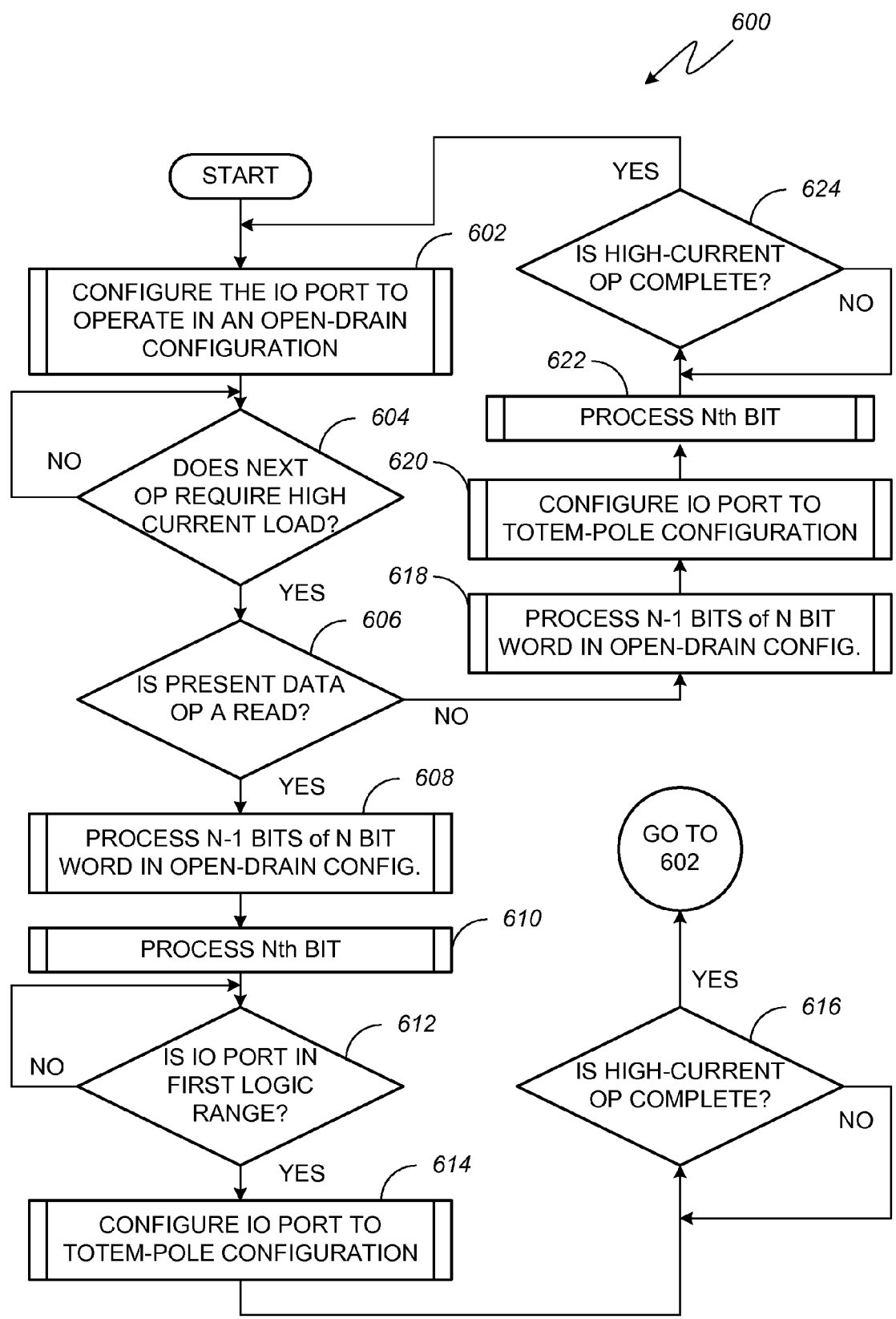
FIG. 6 is a flow diagram illustrating an embodiment of an alternative method for dynamically configuring a controller for a RAID storage volume.

FIG. 6 is a flow diagram illustrating an embodiment of a method 600 for dynamically configuring a RAID controller to communicate with an external device. The flow diagram of FIG. 6 shows the architecture, functionality, and operation of a possible implementation via a circuit or circuits, software and or firmware associated with the RAID controller 300. In this regard, each block represents a module, segment, or portion of code, which comprises one or more executable instructions for implementing the specified function(s). When the RAID controller 300 is implemented via hardware, hardware and firmware, or a combination of hardware and software, one or more blocks in the flow diagram may represent an additional circuit or circuits. Alternatively, the described functions can be embodied in source code including human-readable statements written in a programming language or machine code that comprises instructions recognizable by a suitable execution system such as a processor in a computer system. The machine code may be converted from the source code, etc.

Method 600 begins with block 602 where an IO port of a RAID controller is configured to operate in an open-drain driver configuration. Next, a determination is made in decision block 604 to determine whether the next operation will require a high-current load. A high-current load is any current load that cannot be adequately supplied by the RAID controller to prevent a negative voltage swing on the IO port. When the next operation does not require a high current load, as indicated by the flow control arrow labeled, "NO," the IO port remains in the open-drain configuration. When the next operation will require a high current load, processing continues with decision block 606, where it is determined if a present data operation is a read data operation. When the present data operation is a read operation, processing continues with block 608, where N-1 bits of a N-bit word are processed in an open-drain configuration. Thereafter, the Nth bit is processed, as indicated in block 610 and a determination is made in decision block 612 to identify when the voltage on the IO port has been pulled into a first logic range. As described above, adaptive scanning logic can be enabled during processing of the Nth bit of the N-bit word to determine when the voltage on the IO port has been modified by a slave device. When the voltage has not changed, as indicated by the flow control arrow labeled, "NO," exiting decision block 612, the RAID controller 300 continues to monitor the IO port voltage. Once the voltage on the IO port has changed such that is in the first logic range, processing continues with block 614, where the IO port is configured to operate in a totem-pole configuration. As described above, the totem-pole configuration is capable of providing the necessary current to prevent low voltage swings on the IO port. Thereafter, the RAID controller 300 waits until the high-current operation is complete as indicated by the decision block 616 before returning to block 602, where the IO port is reconfigured to operate in the open-drain configuration.

Otherwise, when it is determined that the present data operation is a write data operation, as indicated by the flow control arrow labeled, "NO," exiting decision block 606, processing continues with block 618 where N-1 bits of an N-bit word are processed in the open-drain configuration. Thereafter, as shown in block 620, the RAID controller 300 configures the IO port to operate in the totem-pole mode before processing the Nth bit, as shown in block 622. Thereafter, the RAID controller 300 waits until the high-current operation is complete as indicated by the decision block 624 before returning to block 602, where the IO port is reconfigured to operate in the open-drain configuration.

Exemplary steps for dynamically configuring a RAID controller to communicate with an external device are illustrated in FIG. 6. The particular sequence of the steps or functions in blocks 602 through 624 is presented for illustration. It should be understood that the order of the steps or functions in blocks 602 through 624 can be performed in any other suitable order or modified in a suitable manner to prevent negative swings of the voltage on the IO port. For example, the queries or determinations associated with decision block 606 and decision block 608 could be performed substantially concurrently or in reverse order from that shown in FIG. 6.

While various embodiments of the controller, program and methods for configuring a RAID controller to communicate with an external device have been described, it will be apparent to those of ordinary skill in the art that many more embodiments and implementations are possible that are within the scope of this disclosure. Accordingly, the described controller, program and methods are not to be restricted or otherwise limited except in light of the attached claims and their equivalents.

What is claimed is:

1. A method for dynamically configuring a controller for a redundant array of inexpensive disks (RAID), comprising:
    determining when an operation preceding a high-current load on an input/output port of the controller is a write operation, if so;
    configuring the input/output port to a totem-pole driver configuration 1-bit transaction earlier; otherwise, when the operation preceding a high-current load on the input/output port of the controller is a read operation,
    adaptively scanning the input/output port during a last bit transaction to detect when the input/output port is in a logic high range, if so,
    configuring the input/output port to the totem-pole driver configuration; otherwise,
    maintaining a present driver configuration.

2. The method of claim 1, wherein determining when an operation preceding a high-current load on an input/output port of the controller comprises determining if the next operation is in a command buffer in the controller.

3. The method of claim 1, wherein maintaining a present driver configuration comprises maintaining an open-drain configuration.

4. The method of claim 1, wherein maintaining a present driver configuration comprises maintaining a high-impedance configuration.

5. The method of claim 1, further comprising: maintaining a present driver configuration for the first N-1 bits of an N-bit word.

6. A method for dynamically configuring a controller for a redundant array of inexpensive disks (RAID), comprising:
    initially configuring the input/output port of the controller to operate in an open-drain configuration;
    using firmware to determine when the next operation requires a high-current load, if so, determining when the present operation is a write operation;
    when the present operation is a write operation, using the input/output port to process N-1 bits of a N-bit word in the open-drain configuration,
        configuring the input/output port to operate in the totem-pole configuration before processing a Nth bit of the N-bit word;
        processing the Nth bit of the N-bit word;
        maintaining the totem-pole configuration until the next operation is complete; and
    reconfiguring the input/output port to operate in the open-drain configuration;
    otherwise, when the present operation is a read operation, using the input/output port to process N- 1 bits of the N-bit word in an open-drain configuration,
        processing the Nth bit of the N-bit word and adaptively scanning the input/output port to determine when the voltage of a signal on the input/put port enters a first logic range, when the input/output port enters the first logic range,
        configuring the input/output port to operate in a totem-pole configuration;
        maintaining the totem-pole configuration until the next operation is complete; and
    reconfiguring the input/output port to operate in the open-drain configuration.

7. The method of claim 6, wherein using firmware to determine when the next operation requires a high-current load comprises identifying when a next operation is a programming operation.

8. The method of claim 6, wherein processing an Nth bit of the N-bit word and adaptively scanning the input/output port comprises receiving data from the slave device.

9. A RAID controller in communication with a slave device, comprising:
    a processor having an input/output port, the input/output port configurable in one of an open-drain driver configuration, a high-impedance driver configuration and a totem-pole driver configuration; and
    a non-volatile memory element configured to store a set of executable instructions that when executed by the processor dynamically adjust the driver configuration to prevent a negative voltage swing of a signal communicated via the input/output port, wherein the dynamically adjusting of the driver configuration comprises:
        determining when an operation preceding a high-current load on an input/output port of the controller is a write operation, if so;
        configuring the input/output port to a totem-pole driver configuration 1-bit transaction earlier; otherwise, when the operation preceding a high-current load on the input/output port of the controller is a read operation,
        adaptively scanning the input/output port during a last bit transaction to detect when the input/output port is in a logic high range, if so,
        configuring the input/output port to the totem-pole driver configuration; otherwise,
        maintaining a present driver configuration.

10. The RAID controller of claim 9, wherein the non-volatile memory element includes a set of executable instructions that when executed by the processor dynamically adjust the driver configuration in response to a data operation that precedes a programming operation that requires a high-current load.

11. The RAID controller of claim 9, wherein the non-volatile memory element includes a set of executable instructions that when executed by the processor dynamically adjust the driver configuration in response to a read operation and an adaptive scan of the voltage at the input/output port, the executable instructions directing the input/output port to operate in the totem-pole driver configuration when the voltage exceeds a threshold voltage.

12. The RAID controller of claim 9, wherein the slave device is coupled to the input/output port via a resistor network.

13. The RAID controller of claim 12, wherein the resistor network comprises a series-pass resistor having a resistance of approximately 100 Ohms and a pull-up resistor having a resistance of approximately 750 Ohms.

14. The RAID controller of claim 13, wherein the pull-up resistor is coupled to a power supply providing a voltage of approximately 3.3 volts.

15. A program including a set of executable instructions embodied on a non-transitory computer readable storage medium, comprising:
    logic configured to determine when a next operation to be processed by a controller requires a current level in excess of a maximum current that can be supplied by a pull-up resistor network;
    logic configured to determine the nature of a present data operation on an input/output port of the controller;

modified read logic responsive to the logic configured to determine the nature of the present data operation and configured to direct an input/output port to process N-1 bits of an N-bit word in an open-drain configuration,
  process an Nth bit of the N-bit word and determine when the input/output port enters a first logic range, when the input/output port enters the first logic range,
  configure the input/output port to operate in a totem-pole configuration,
  maintain the totem-pole configuration until the next operation is complete, and
  configure the input/output port to operate in the open-drain configuration; and
modified write logic responsive to the logic configured to determine the nature of the present data operation and configured to direct an input/output port to process N-1 bits of an N-bit word in an open-drain configuration,
  configure the input/output port to operate in the totem-pole configuration before processing an Nth bit of the N-bit word,
  process the Nth bit of the N-bit word,
  maintain the totem-pole configuration until the next operation is complete, and
  configure the input/output port to operate in the open-drain configuration.

16. The program of claim 15, wherein the logic configured to determine when a next operation to be processed by a controller requires a current level in excess of a maximum current is responsive to a next mode flag.

17. The program of claim 15, wherein the logic configured to determine the nature of a present data operation on an input/output port of the controller is responsive to a data operation flag.

18. The program of claim 15, wherein the modified read logic comprises adaptive scan logic configured to determine when the input/put port enters the first logic range.

\* \* \* \* \*